No. 752,927.

Patented February 23, 1904.

UNITED STATES PATENT OFFICE.

HEINRICH F. D. SCHWAHN, OF ST. LOUIS, MISSOURI.

PROCESS OF PREPARING ALUMINIUM SULFATE.

SPECIFICATION forming part of Letters Patent No. 752,927, dated February 23, 1904.

Application filed June 12, 1902. Serial No. 111,404. (No specimens.)

*To all whom it may concern:*

Be it known that I, HEINRICH F. D. SCHWAHN, a citizen of the United States, residing at St. Louis, in the State of Missouri, have invented certain new and useful Improvements in Processes of Treating Aluminous Materials, of which the following is a specification.

This invention is an improved method of treating clays, shales, or other aluminous compounds for their purification and for the rapid and economical production therefrom of aluminium sulfate.

The most objectionable impurities in aluminium sulfate are iron and silica. The crude sulfate prepared by the action of sulfuric acid upon clays and shales contains these impurities in large amounts, and their separation has heretofore been a tedious and expensive operation.

According to my improved method the raw clay or other aluminous mineral is first ground, if necessary, to pass through a thirty or forty mesh screen. The resultant material may then be washed with water and is thereafter mixed with hydrochloric acid, preferably hot and moderately concentrated and in quantity sufficient to convert the mass into a pulp having the consistency of a stiff mortar. The mixture is then allowed to stand for a period varying from one or two hours to one or two days, according to its content of iron, its more or less refractory character, and its degree of subdivision. During this period the temperature is preferably maintained by any suitable means at about 80° centigrade. Under these conditions the acid is permitted to exert its solvent effect for the necessary time and under the most favorable conditions upon a raw material which has not been rendered refractory by a previous ignition. The resultant disintegrated mass is then charged into a furnace and the temperature maintained at the minimum degree sufficient to volatilize the ferric chlorid formed by reaction of the acid with the contained iron and the residual hydrochloric acid. For this purpose a temperature of 120° to 150° centigrade is sufficient. The volatilized products may be collected and treated in any known or suitable manner for the recovery of chlorin and the regeneration of the acid, such recovered acid being employed in a repetition of the process. In some cases it will be found necessary to repeat the digestion with hydrochloric acid and the subsequent distillation to secure entire elimination of the iron. The remaining mass now freed from its iron is preferably transferred to a second furnace, in which a somewhat higher temperature—say 250° to 300° centigrade—is maintained, the object being to dehydrate the silicic acid and to render it insoluble in the subsequent stages of the process. A temperature greatly exceeding the limits mentioned must be avoided as tending to render difficult the subsequent solution of the aluminium. This operation might obviously be conducted in the furnace used for the volatilization of the ferric chlorid; but I find that the operation can be better controlled and its continuity better assured by using separate furnaces, as stated. The product is now charged into a suitable receptacle containing weak sulfuric acid, the preferred proportions being about three parts of the weak acid to one part of the charge, and is agitated therein by a current of air, preferably heated and introduced in such manner as to secure a thorough circulation of the contents of the vat. Stronger sulfuric acid, ordinary chamber acid being most suitable, is now added from time to time until a sufficient quantity is present to convert all or nearly all of the aluminium present into sulfate. The injection of heated air is continued during the whole of this portion of the operation, and from time to time water may be added, if necessary, to maintain the pulp in a sufficiently-fluid condition to permit it to circulate in the vat. Six to twelve hours are usually consumed in this stage of the process. In case an excess of acid has been added purified pulp may be introduced in quantity sufficient to neutralize it. The pulp, consisting now of aluminium sulfate, insoluble silica, and any residue of impurities not dissolved by sulfuric acid, is diluted with water, and the clear solution of aluminium sulfate is separated from the insoluble residium, preferably by filtration. The filtrate or clear solution otherwise obtained is concentrated by heat until a sample congeals on cooling to a hard scale, when the whole is poured into molds and cooled to form the marketable product.

The injected air serves to agitate the mixture, and thereby to bring the acid into intimate contact with all parts of the charge; but this function is largely incidental, since any agitating means would effect this result. The use of air is distinguished, however, from agitation by other means in that it acts to accelerate the reaction to a very marked degree, reducing the time required for the solution of the alumina to a small fraction of that heretofore necessary. Furthermore, the use of hot air, as described, possesses the additional function of maintaining the proper temperature for the reaction.

It will be seen that at no stage of the operation does the temperature exceed 300° centigrade. I have found that by the use of the relatively low temperature herein named the conversion of the raw clay to pure aluminium sulfate is greatly facilitated, the effect of calcination at any stage of the process or of temperatures greatly exceeding those mentioned being to increase greatly the resistance offered by the aluminium compounds to the disintegrating and solvent action of the acids.

Although I have specified hydrochloric acid as the preferred agent for converting the iron into chlorid, it will be obvious that free chlorin or any other reagent capable of effecting this conversion may be substituted therefor.

I claim—

1. The herein-described method of purifying aluminous materials containing iron, which consists in subjecting them in the raw state to the action of a chloridizing agent to convert the iron into ferric chlorid, and then heating the mass to a temperature above the volatilizing-point of ferric chlorid but below the point at which aluminium compounds become insoluble, as set forth.

2. The herein-described process of purifying aluminous materials containing iron and silica which consists in subjecting them in the raw state to the action of a chloridizing agent to convert the iron into ferric chlorid, and heating the resultant product first to a temperature sufficient to volatilize the ferric chlorid and then to a higher temperature to render the silica insoluble in acids, as set forth.

3. The herein-described process of purifying aluminous materials containing iron and silica which consists in subjecting them in the raw state to the action of a chloridizing agent to convert the iron into ferric chlorid, heating the resultant product first to a temperature sufficient to volatilize the ferric chlorid, and then to a higher temperature to render the silica insoluble in acids, the temperature in each stage being maintained at the minimum degree capable of effecting the required result, as set forth.

4. The herein-described process of preparing aluminium sulfate from aluminous materials containing iron which consists in subjecting such materials in the raw state to the action of a chloridizing agent to convert the iron into ferric chlorid, heating them to a temperature sufficient to volatilize the ferric chlorid, treating the resultant product with sulfuric acid to convert the aluminium compounds into sulfate, and simultaneously injecting air into the resultant mixture of acid and aluminous material, as set forth.

5. The herein-described process of preparing aluminium sulfate from aluminous materials containing iron which consists in subjecting such materials in the raw state to the action of a chloridizing agent to convert the iron into ferric chlorid, heating them to a temperature sufficient to volatilize the ferric chlorid, treating the resultant product with sulfuric acid to convert the aluminium compounds into sulfate, and simultaneously injecting hot air into the resultant mixture of acid and aluminous material, as set forth.

6. The herein-described process of preparing aluminium sulfate from aluminous materials containing iron which consists in subjecting such materials in the raw state to the action of a chloridizing agent to convert the iron into ferric chlorid, heating them to a temperature sufficient to volatilize the ferric chlorid, and treating the resultant product with sulfuric acid of gradually-increasing strength to convert the aluminium compounds into sulfate, as set forth.

7. The herein-described process of preparing aluminium sulfate from aluminous material containing iron which consists in subjecting such materials in the raw state to the action of a chloridizing agent to convert the iron into ferric chlorid, heating them to a temperature sufficient to volatilize the ferric chlorid, treating the resultant product with sulfuric acid to convert the aluminium compounds into sulfate, separating the sulfate solution from the insoluble residium, and concentrating it, as set forth.

8. The herein-described process of preparing aluminium sulfate from aluminous materials which consists in treating such materials with sulfuric acid to convert the aluminium compounds into sulfate, and simultaneously injecting air into the resultant mixture of acid and aluminous materials, as set forth.

9. The herein-described process of preparing aluminium sulfate from aluminous materials which consists in treating such materials with sulfuric acid to convert the aluminium compounds into sulfate, and simultaneously injecting hot air into the resultant mixture of acid and aluminous materials, as set forth.

10. The herein-described process of preparing aluminium sulfate from aluminous materials which consists in treating such materials with sulfuric-acid solution of gradually-increasing strength to convert the aluminium compounds into sulfate, and simultaneously injecting air into the resultant mixture of acid and aluminious materials, as set forth.

H. F. D. SCHWAHN.

Witnesses:
  HANNAH M. HOSIE,
  GEO. HANKE.